(12) United States Patent
McMaster et al.

(10) Patent No.: US 6,390,052 B1
(45) Date of Patent: May 21, 2002

(54) WOBBLE ENGINE

(75) Inventors: Harold A. McMaster, Perrysburg; Robert G. McMaster, Elmore, both of OH (US)

(73) Assignee: McMaster Motor Company, Perrysburg, OH (US)

( * ) Notice: Subject to any disclaimer, the term of this patent is extended or adjusted under 35 U.S.C. 154(b) by 0 days.

(21) Appl. No.: 09/778,118

(22) Filed: Feb. 5, 2001

Related U.S. Application Data

(63) Continuation-in-part of application No. 09/690,638, filed on Oct. 17, 2000.

(51) Int. Cl.$^7$ ............................................... F02B 53/00
(52) U.S. Cl. ..................... 123/247; 123/241; 123/58 R; 123/43 R; 418/53
(58) Field of Search ............................... 123/247, 241, 123/58 R, 43 R; 418/53, 52, 51, 49

(56) References Cited

U.S. PATENT DOCUMENTS

| | | | | |
|---|---|---|---|---|
| 410,308 A | * | 9/1889 | Bowns | 418/53 |
| 2,043,544 A | * | 6/1936 | Kempthorne | 123/43 R |
| 2,621,852 A | * | 12/1952 | Pisa | 418/68 |
| 2,922,403 A | * | 1/1960 | Russell | 418/53 |
| 4,688,522 A | | 8/1987 | McMaster | |
| 4,799,870 A | | 1/1989 | McMaster | |
| 5,027,756 A | * | 7/1991 | Shaffer | 123/58 R |
| 5,251,594 A | | 10/1993 | Meyer | |
| 5,482,449 A | * | 1/1996 | Meyer | 418/53 |

FOREIGN PATENT DOCUMENTS

| | | | | |
|---|---|---|---|---|
| DE | 24 44 019 A1 | * | 3/1976 | 418/53 |
| FR | 2 591 673 A1 | * | 6/1987 | 123/241 |
| GB | 10846 | * | 4/1845 | 418/53 |
| GB | 12964 | * | 8/1850 | 418/53 |
| GB | 1269063 | * | 3/1972 | 418/51 |

* cited by examiner

Primary Examiner—Thomas Denion
Assistant Examiner—Thai-Ba Trieu
(74) Attorney, Agent, or Firm—Brooks & Kushman P.C.

(57) ABSTRACT

A wobble plate engine (20) includes a wobble plate assembly (26) having a wobble plate (58) that rolls against truncated cone portions (42) of a housing (22) and has an inner extremity (60) rotatably supported by an axially inclined annular bearing (49, 49') on a spherical member (46) of the wobble plate assembly so as to rotate a shaft (24) during the wobbling motion. One embodiment of the wobble engine (20) includes an oil lubrication system (114) and another embodiment includes antifriction roller bearings (220) that support the wobble plate (58) on the spherical member (46), antifriction roller bearings (224) that rotatively support the shaft (24) on the housing (22') and seals (226) that rotatively seal between the shaft (24) and the housing (22').

38 Claims, 10 Drawing Sheets

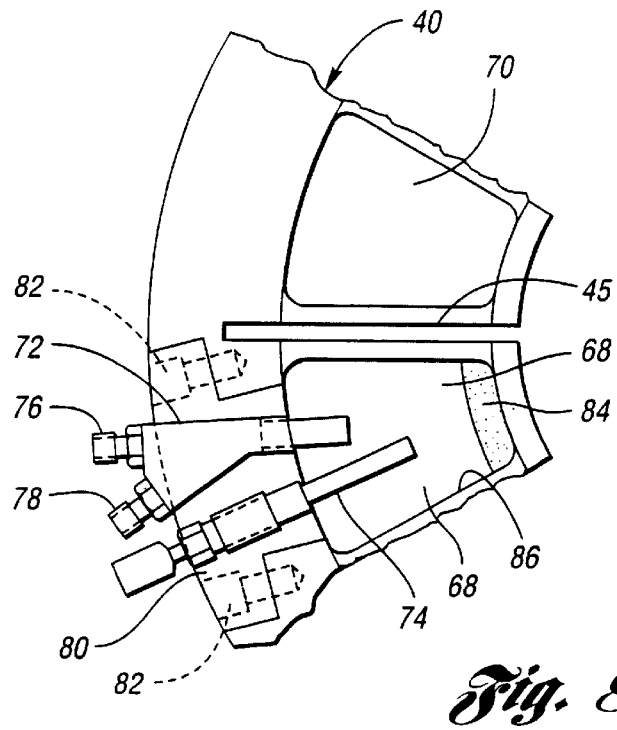
Fig. 8
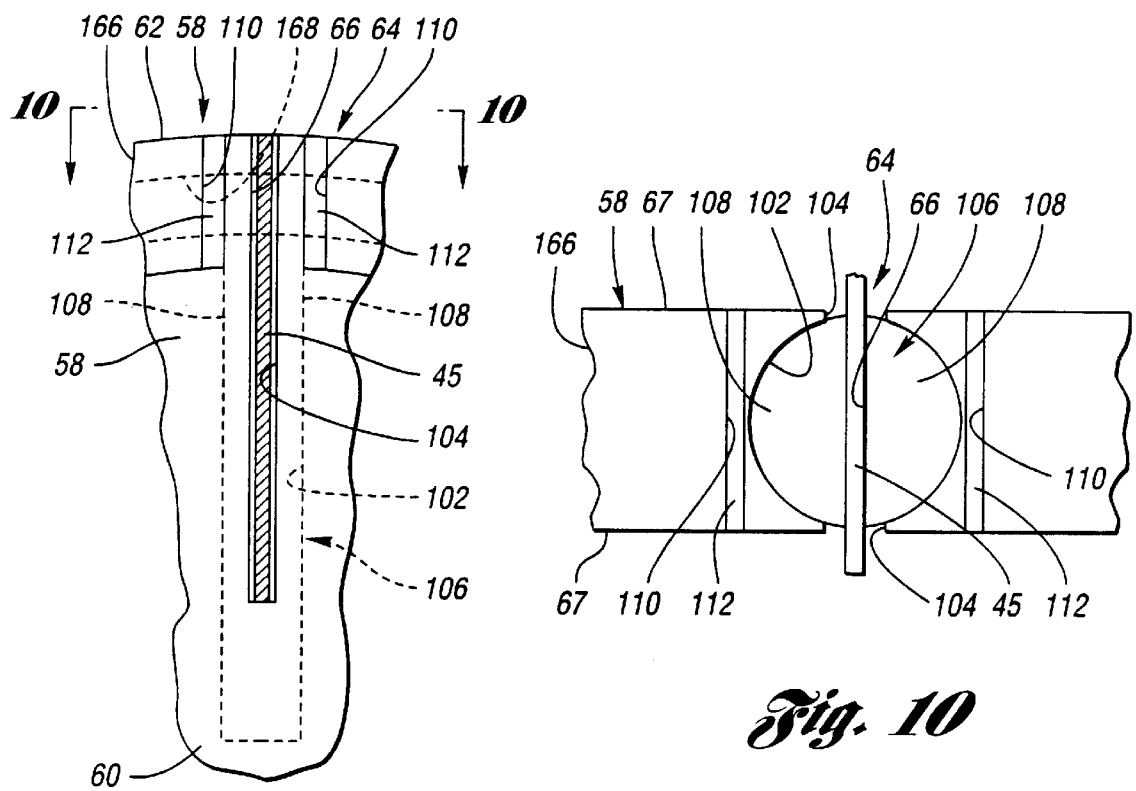
Fig. 9
Fig. 10

WOBBLE ENGINE

CROSS-REFERENCE TO RELATED APPLICATIONS

This application is a continuation-in-part of prior application Ser. No. 09/690,638, filed on Oct. 17, 2000 by Harold A. McMaster and Robert G. McMaster under the title WOBBLE ENGINE.

TECHNICAL FIELD

This invention relates to a wobble engine including a housing and a wobble plate assembly that wobbles within the housing to rotate a shaft of the engine.

BACKGROUND ART

U.S. Pat. No. 4,688,522 McMaster and U.S. Pat. No. 4,799,870 McMaster disclose fluid power transfer devices wherein a generally spherical housing receives rotors that have conical faces which roll against each other in association with a vane to provide a rotary output to shafts connected to the rotors.

Also, U.S. Pat. No. 5,251,594 Meyer discloses a neutating internal combustion engine wherein a crankshaft has an angular portion that connects two drive shafts and is received within a ball having an annular disk with conical faces that roll along opposing parallel wall surfaces. Fuel supplied within the engine through associated valves provides a rotary motion to the crankshaft and driving of its shafts connected by the angular shaft portion. Precise and hence relatively expensive machining of the crankshaft is required so that the ball and its annular disk with the conical surfaces will roll against the engine wall surfaces and rotate the crankshaft through its angular portion.

DISCLOSURE OF INVENTION

An object of the present invention is to provide an improved wobble engine for use as an internal combustion engine, a heat engine, or a fluid power transfer device for transferring power to or from rotary motion.

In carrying out the above object, the wobble engine of the invention has a housing including an outer annular portion having an interior with a spherical shape that is symmetrically truncated on opposite sides of a great circle of its spherical shape. The housing also includes a pair of cone portions that converge toward each other along a central rotational axis and that have truncated inner extremities. The spherically shaped outer annular portion cooperates with the truncated cone portions to define an annular cavity. A vane extends parallel to the central axis across the annular cavity. A shaft of the engine extends along and is rotatable about the central axis. The engine also includes a wobble plate assembly located within the housing for wobbling motion and including a spherical member rotatively fixed to the shaft. The spherical member has an annular bearing that extends obliquely with respect to the central axis. The wobble plate assembly also includes a wobble plate of a generally annular shape having an inner extremity that is rotatably supported by the annular bearing of the spherical member and having an outer extremity that is slidably engaged with the spherical shape of the outer annular portion of the housing. The wobble plate has a slot that extends radially with respect to the spherical member and that receives the vane of the housing in a slidable relationship with the vane. The wobble plate has oppositely facing surfaces that respectively roll along the pair of truncated cone portions of the housing at diametrically opposite sides of the spherical member.

The wobble engine as disclosed includes a pair of combustion chambers spaced form each other along the central axis on one circumferential side of the vane. The housing also includes a pair of exhaust chambers spaced from each other along the central axis on the opposite circumferential side of the vane as the pair of combustion chambers. Each of the pair of combustion chambers includes an associated fuel injector for injecting fuel thereinto for combustion, and each of the pair of combustion chambers also includes a glow plug for igniting the fuel for combustion. The wobble engine has particular utility for use with two component fuels such as hydrogen and oxygen, propane and oxygen, and ammonia and nitrous oxide. Each of the pair of combustion chambers includes an associated fuel injector for receiving the two fuel components for injection into the combustion chamber where each combustion chamber has a glow plug for igniting the ammonia and nitrous oxide for combustion. The combustion chambers also are disclosed as having a refractory liner that is preferably made of silicon carbide, a refractory oxide or a mixture of refractory oxides.

The wobble plate of the wobble engine includes a vane seal that defines the slot thereof for slidably sealing with the vane. The wobble plate has a radially extending round bore and radially extending openings through which the vane extends, and the vane seal is constructed as a bifurcated dowel having seal portions that slidably contact opposite sides of the vane.

The wobble engine is also disclosed in one embodiment as including a second vane that extends parallel to the central axis across the annular cavity. The wobble plate has a second slot that extends radially with respect to the spherical member and that receives the second vane of the housing in a slidable relationship therewith. The wobble plate of this embodiment includes a pair of vane seals that define the slots thereof for slidably sealing with the vanes. The wobble plate in this embodiment has a pair of radially extending round bores and radially extending openings through which the vanes extends and each vane seal is embodied by a bifurcated dowel having seal portions that slidably contact opposite sides of the vane.

One embodiment of the wobble engine includes an oil lubrication and cooling system for passing oil into the housing, through the wobble plate assembly, and back out of the housing. This oil lubrication and cooling system includes an oil inlet into the housing, supply passages in the housing from the inlet to the wobble plate assembly, distribution passages in the wobble plate assembly for distributing the oil to the inner and outer extremities of the wobble plate, return passages in the housing from the wobble plate assembly, and an oil outlet to which the return passages return the oil from the wobble plate assembly for flow out of the housing for cooling and recycling. The wobble plate includes a first set of radially extending distribution passages that are spaced circumferentially from each other and having inner and outer ends with the inner ends being fed oil from the supply passages adjacent the inner extremity of the wobble plate. An annular outer distribution passage of the wobble plate receives oil from the outer ends of the first set of radially extending distribution passages. A second set of radially extending distribution passages of the wobble plate are spaced circumferentially from each other and have inner and outer ends with the outer ends receiving oil from the annular outer distribution passage and with the inner ends feeding the oil to the return passages for flow from the housing through the oil outlet. The first and second sets of radially extending distribution passages of the wobble plate are circumferentially spaced in an alternating relationship with respect to each other for uniform cooling.

The outer extremity of the wobble plate includes an outer annular central seal that slidably seals with the spherically shaped outer annular portion of the housing. The outer extremity of the wobble plate also has oil seal passages that extend from the annular distribution passage to the outer annular central seal to provide lubrication. The wobble plate also includes a pair of outer annular side seals located on opposite sides of the outer annular central seal, and the outer extremity of the wobble plate has side seal passages that extend from the annular cavity to the outer annular side seals such that pressure supplied thereto from the annular cavity provides sealing thereof with the spherically shaped outer annular portion of the housing.

In its preferred construction, the wobble plate includes a central plate and an outer annular ring that cooperates with the central plate to define the annular outer distribution passage. The outer annular ring has an annular central groove that receives the outer annular central seal and has a pair of annular side grooves that respectively receive the pair of outer annular side seals. The outer annular ring defines the oil seal passages and the side seal passages.

The shaft of the wobble engine includes a first helical groove for preventing the oil from exiting the supply passages adjacent the shaft. The shaft also includes a second helical groove for preventing the oil from exiting the return passages adjacent the shaft.

Different embodiments of the annular bearing are disclosed. In one embodiment, the annular bearing is a journal bearing including an annular groove in the spherical member that receives and rotatably supports the inner extremity of the wobble plate. In another embodiment, the annular bearing is an antifriction thrust bearing including roller elements. In a further embodiment, the annular bearing includes at least one antifriction roller bearing that rotatably supports the inner extremity of the wobble plate on the spherical member and has roller elements that rotate about associated axes extending transverse to the wobble plate.

The housing of the wobble engine includes a generally annular housing member having opposite axial ends and an intermediate portion that extends between its ends and defines the spherically shaped outer annular portion of the housing. The housing also includes a pair of cone members that are respectively secured to the opposite axial ends of the annular housing member and have frustoconical surfaces that define the truncated cone portions of the housing. The frustoconical surfaces of the cone members have plate seals that extend radially and axially from the central axis and that seal with the wobble plate upon rolling thereof along the frustoconical surfaces. The frustoconical surfaces of the cone members have seal grooves, while the plate seals include seal members that are respectively received by the seal grooves with springs of the plate seals resiliently biasing the seal members. The seal members have outer extremities that are resiliently positioned outwardly from the seal grooves so as to resiliently engage and seal with the wobble plate upon the rolling thereof along the frustoconical surfaces.

The annular housing member and the pair of cone members have vane grooves that receive the vane that extends across the annular cavity of the housing. The vane has a partially circular inner extremity that slidably contacts the spherical member of the wobble plate assembly. The vane groove of the annular housing member includes a spring that resiliently biases the vane against the spherical member of the wobble plate assembly to accommodate for thermal expansion and contraction.

The housing of the wobble engine includes a pair of annular end plates secured to the annular housing member, and the pair of cone members have support portions that are respectively supported by the pair of annular end plates. The support portions of the cone member have the shaft extending therethrough and include seals that rotatably seal with the shaft and with the spherical member of the wobble plate.

The disclosed construction of the annular housing member includes half sections that have semicircular shapes with engaged faces that are secured to each other.

The spherical member of the wobble plate includes a pair of hemispheres having engaged faces that each include an annular groove portion for cooperating with the other annular groove portion to define the annular groove of the spherical member.

The one embodiment of the annular bearing discussed above includes a pair of antifriction roller bearings that rotatably support the inner extremity of the wobble plate on the spherical member and have roller elements that rotate about associated axes extending transverse to the wobble plate. This embodiment of the wobble engine also includes a pair of antifriction roller bearings that rotatably support the shaft on the housing. Furthermore, this embodiment of the wobble engine includes a pair of seals that rotatively seal between the shaft and the housing outward from the pair of antifriction roller bearings that rotatably support the shaft on the housing.

The objects, features and advantages of the present invention are readily apparent from the following detailed description of the best mode for carrying out the invention when taken in connection with the accompanying drawings.

BRIEF DESCRIPTION OF DRAWINGS

FIG. 8 is a view taken along the direction of line 8—8 in FIG. 2 to illustrate a fuel injector and glow plug of a combustion chamber of the engine.

FIG. 9 is an enlarged view of a portion of FIG. 4 to illustrate the construction of a vane seal.

FIG. 10 is a view taken along the direction of line 10—10 in FIG. 9 to further illustrate the construction of the vane seal.

BEST MODE FOR CARRYING OUT THE INVENTION

Figure 1:
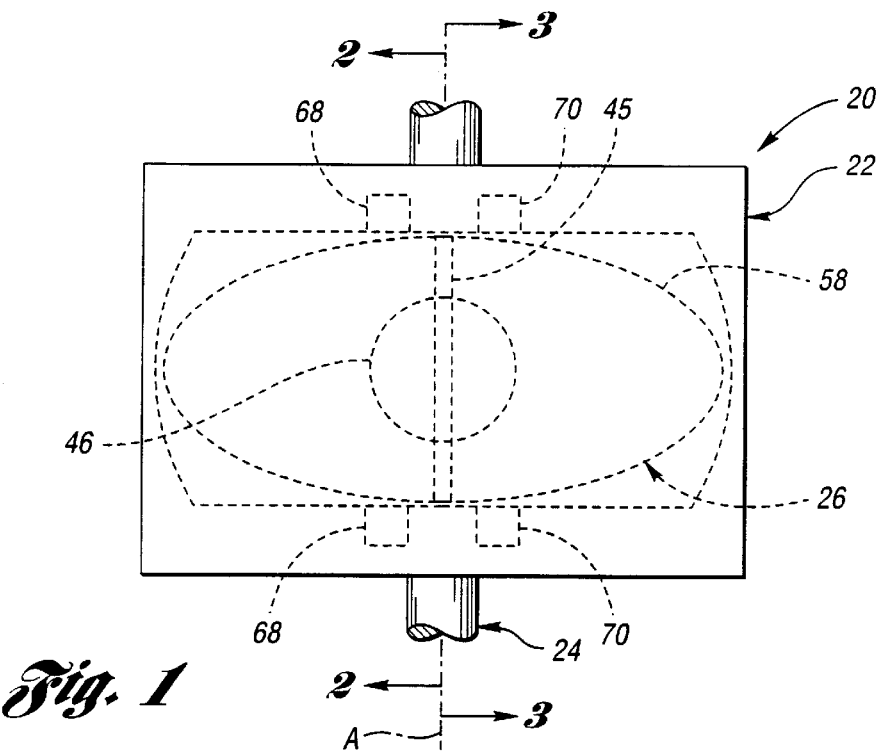
FIG. 1 is a schematic side view of a wobble engine constructed in accordance with the invention.

With reference to FIG. 1 of the drawings, one embodiment of a wobble engine constructed in accordance with the invention is schematically illustrated and identified by reference numeral 20. The wobble engine 20 includes a housing 22, a shaft 24 rotatable about a central axis A, and a wobble plate assembly 26 that is located within the housing for wobbling motion that rotates the shaft 24 as is hereinafter more fully described.

Figure 2:
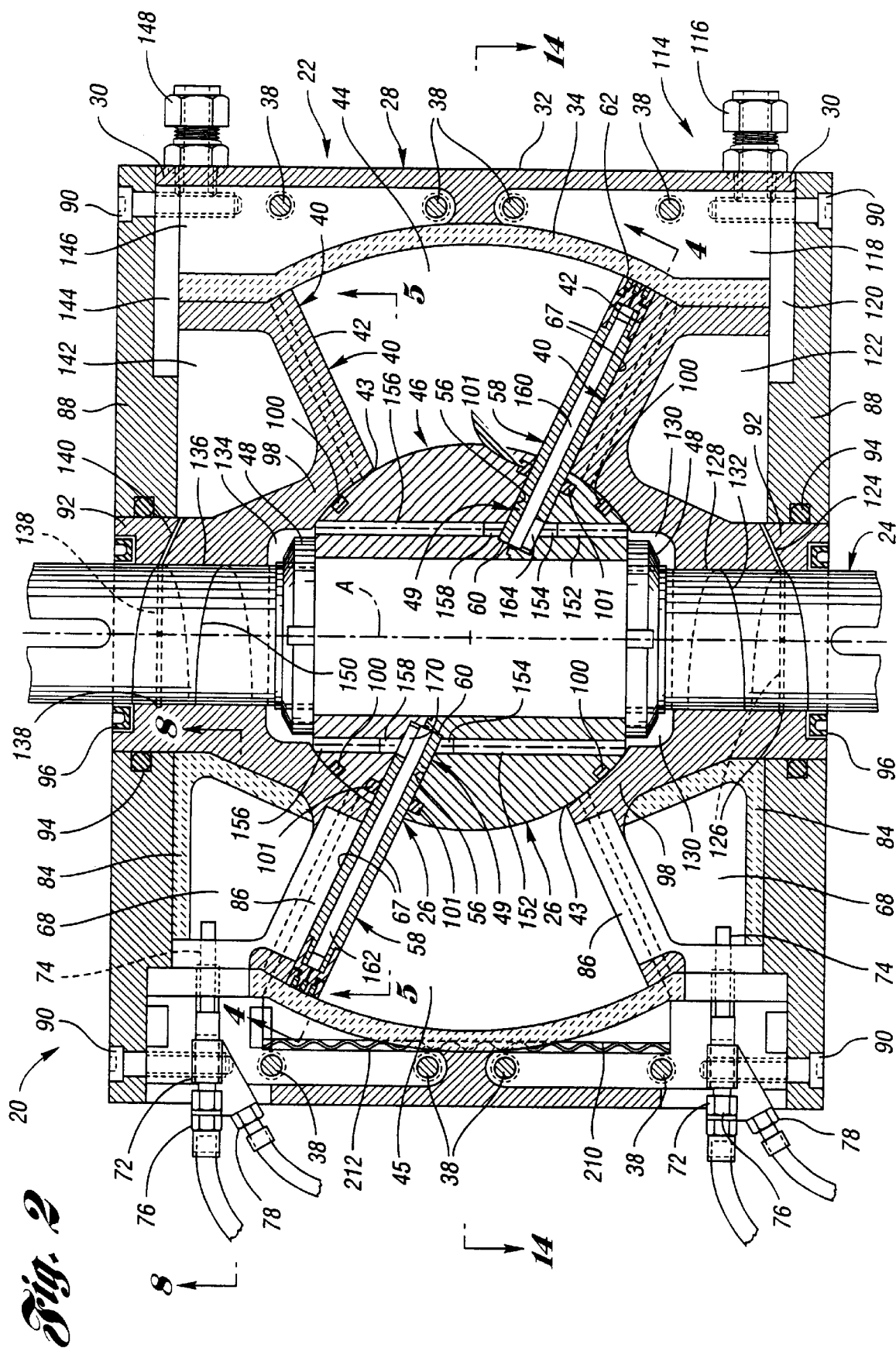
FIG. 2 is a sectional view taken through the wobble engine along the direction of line 2—2 in FIG. 1 to illustrate the construction thereof and to show combustion chambers of the engine.
Figure 3:
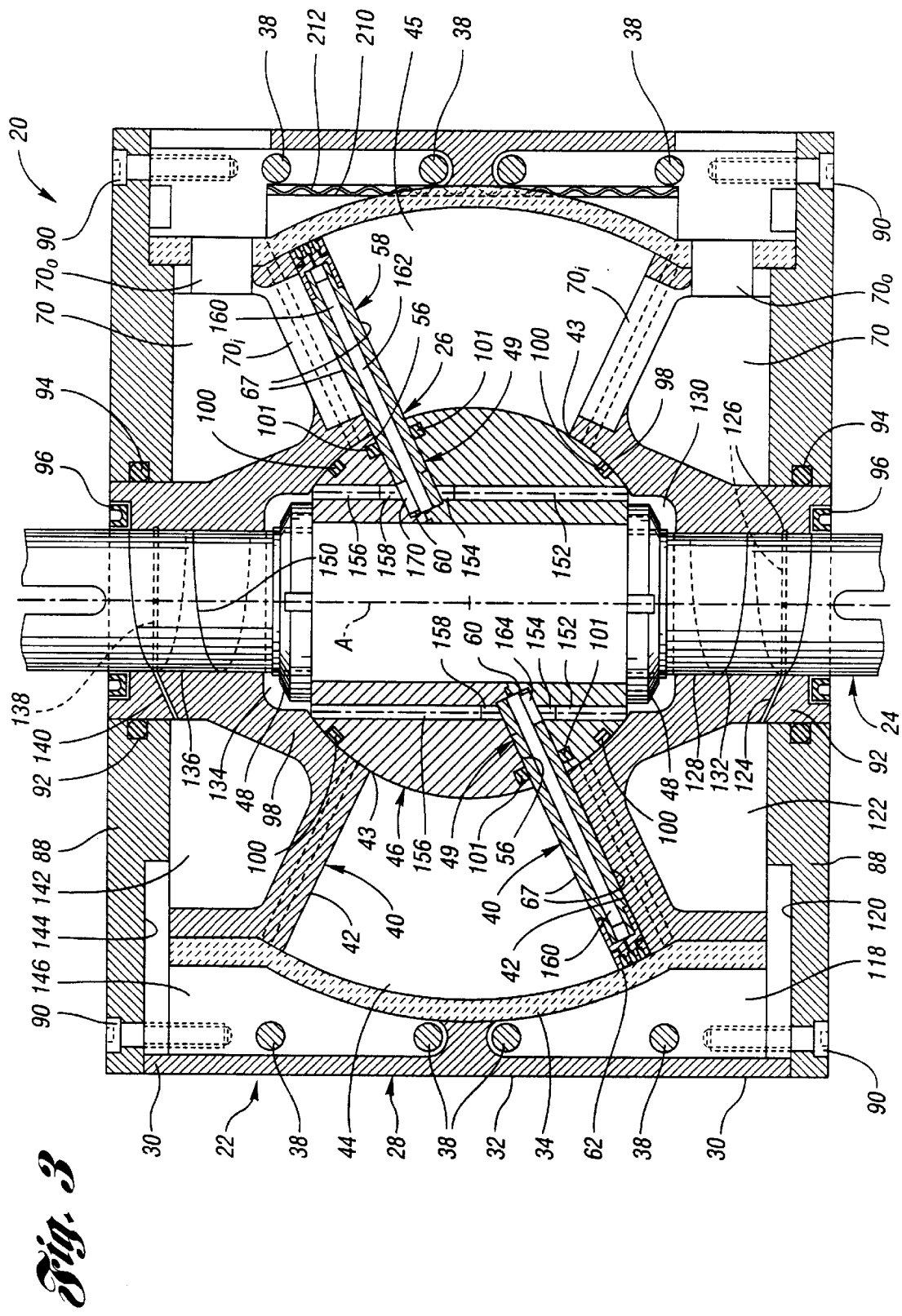
FIG. 3 is a sectional view taken through the wobble engine along the direction of line 3—3 in FIG. 1 and illustrates exhaust chambers of the engine.
Figure 14:
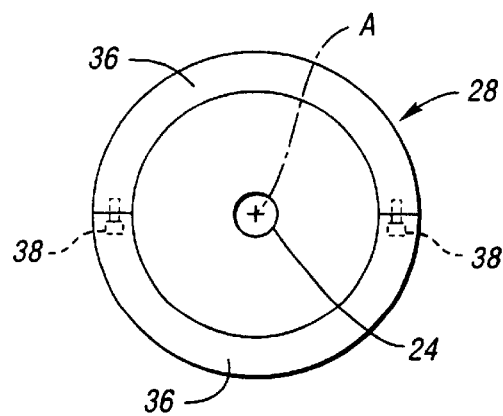
FIG. 14 is a schematic view taken in the direction of line 14—14 in FIG. 2 to illustrate half sections of an annular housing member of the housing.

As illustrated in FIGS. 2 and 3, the housing 22 includes an annular housing member 28 having opposite axial ends 30 and an intermediate portion 32 extending between its ends. The intermediate portion 32 of the annular housing member 28 includes an outer annular portion 34 having an interior with a spherical shape that is truncated on opposite sides of a great circle thereof through a horizontal mid plane of the housing between its upper and lower ends. The annular housing member as schematically illustrated in FIG. 14 includes half sections 36 that have semicircular shapes with engaged faces that are secured to each other by a plurality of bolts 38 which, as illustrated in FIGS. 2 and 3, are spaced along the intermediate portion 32 of the annular housing member 28.

With continuing reference to FIGS. 1 and 2, the housing 22 also includes a pair of cone members 40 that have a pair of cone portions 42 that converge toward each other along the central rotational axis A and that have truncated inner extremities 43. The spherically spaced outer annular portion 34 of the annular housing member 28 cooperates with the truncated cone portions 42 to define an annular cavity 44 extending around the central rotational axis A along which the shaft 24 extends. A vane 45 extends parallel to the central axis A across the annular cavity 44 at its left side as shown in FIG. 2.

Figure 11:
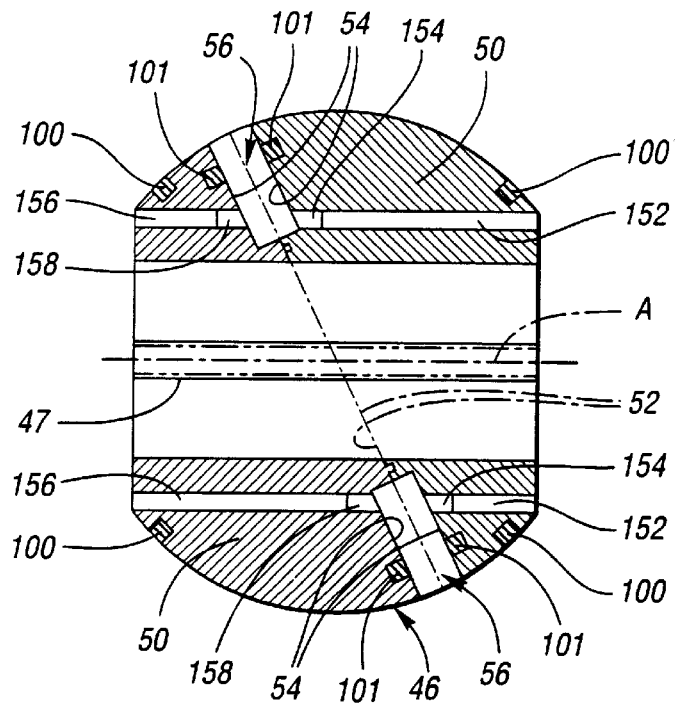
FIG. 11 is a sectional view taken through a spherical member of the wobble plate assembly of the engine to illustrate hemispheres thereof.

With continuing reference to FIG. 2 and also to FIG. 3, the wobble plate assembly 26 of the engine is located within the housing for wobbling motion as previously discussed and includes a spherical member 46 that is rotatively fixed on the shaft 24 by a spline connection 47 (FIG. 11) and is axially fixed by a pair of lock nuts 48. The spherical member 46 includes an annular bearing 49 which is a journal bearing in the embodiment of FIGS. 2 and 3. The annular bearing 49 extends obliquely to the central rotational axis A as is hereinafter more fully described. In its preferred construction shown in FIG. 11, the spherical member 46 includes a pair of hemispheres 50 with engaged faces 52, and each hemisphere includes an annular groove portion 54 for cooperating with the other annular groove portion to define an annular groove 56 in the spherical member. This annular groove 56 extends obliquely with respect to the central rotational axis A about which the engine shaft 24 rotates and defines an acute angle therewith in the range of 20 to 30° and most preferably about 25°.

Figure 4:
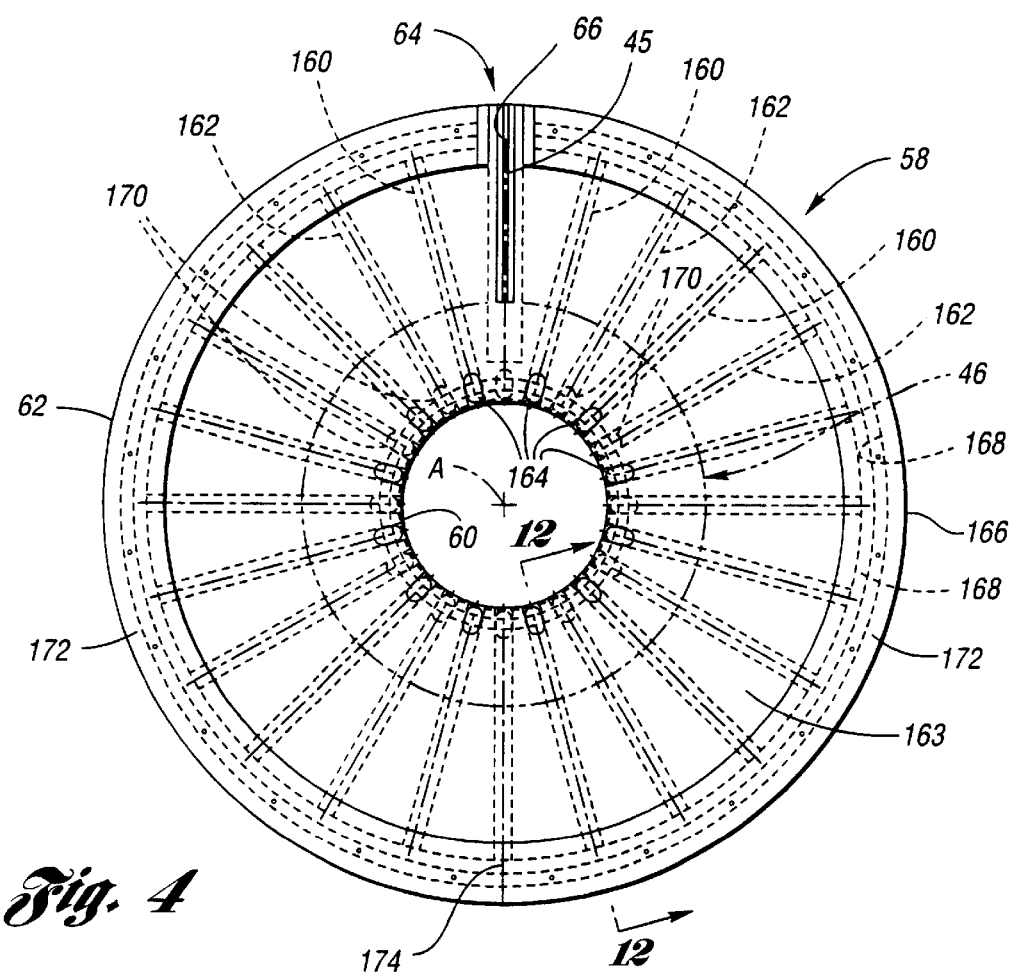
FIG. 4 is a view taken along the direction of line 4—4 of FIG. 2 to illustrate the construction of a wobble plate of the wobble plate assembly of the engine.

As shown in FIGS. 2–4, the wobble plate assembly also includes a wobble plate 58 of a generally annular shape having an inner extremity 60 that is rotatably supported by the annular bearing 49 by being received within the annular groove 54 of the spherical member 46. An outer extremity 62 of the wobble plate 58 is slidably engaged with the spherical shape of the outer annular portion 34 of the annular housing member 28 of the housing 22 as is hereinafter more fully described. The wobble plate 58 as shown in FIGS. 4, 9 and 10 also includes a vane seal 64 that defines a slot 66 that extends radially with respect to the spherical member 46 of the wobble plate and receives the vane 45 of the housing in a slidable relationship. Oppositely facing surfaces 67 of the wobble plate 58 roll along the cone portions 42 of the cone members 40 of the housing at diametrically opposite sides of the spherical member. During such rolling, the wobble plate inner extremity 60 which is rotatably supported by the annular bearing 49 rotates with respect to the spherical member 46 and imparts a rotational movement therein about the central axis A so as to rotate the shaft 24.

As illustrated in FIG. 1, the housing 22 of the wobble engine includes a pair of combustion chambers 68 spaced from each other along the central axis A on one side of the vane 45. In addition, the housing 22 also includes a pair of exhaust chambers 70 spaced from each other along the central axis A on the opposite circumferential side of the vane as the pair of combustion chambers 68. Each combustion chamber 68 and an associated exhaust chamber 70 are separated by 180° of the wobble motion during which axial force applied to the wobble plate 58 by combustion within the associated combustion chamber is transferred through the annular bearing 49 into rotary motion of the shaft 24. After each 180° segment of wobble motion, the next combustion chamber 68 then fires as is hereinafter described to continue the wobbling for the next one half cycle of 180° of wobbling motion.

As shown in FIGS. 2 and 8, each of the pair of combustion chambers 68 includes an associated fuel injector 72 for injecting fuel into the combustion chamber for combustion. Each combustion chamber also includes a glow plug 74 for igniting the fuel for combustion. More specifically, the fuel injector 72 of each combustion chamber includes a first inlet 76 for receiving one fuel component and a second inlet 78 for receiving another fuel component. The fuel components are mixed during the injection and then ignited by the glow plug 74. The engine can operate with hydrogen and oxygen, propane and oxygen, and ammonia and nitrous oxide, etc. Both the injector 72 and the glow plug 74 are supported by an ignition mount 80 that is secured to the housing by associated bolts 82. As shown in FIG. 2, each of the combustion chambers 68 includes a refractory liner 84 that is preferably made of silicon carbide, a refractory oxide such as silicon oxide, aluminum oxide and zirconium oxide, or a mixture of refractory oxides. Thus, the fuel that is injected into the combustion chamber 68 by the associated fuel injector 72 and ignited by the glow plug 74 and the resultant heat is withstood by the refractory liner 84 with the combustion causing the rolling action of the wobble plate by passage through an outlet 86 in the cone portion 42 of the associated cone member 40. The engine construction is particularly effective since it can operate without the need for any intake or exhaust valves. Also, as shown in FIG. 3, the exhaust chambers 70 have inlets $70_i$ for receiving the exhaust gases from the annular cavity 44 and have outlets $70_o$ through which the exhaust gases flow.

The engine housing 22 includes a pair of annular end plates 88 that are respectively secured by a plurality of bolts 90 to the opposite ends 30 of the annular housing member 28. The pair of cone members 40 have support portions 92 of annular shapes that are supported by the end plates 88 in a sealed relationship provided by seals 94. The shaft 24 extends through the support portions 92 which also includes seals 96 for sealing with the shaft. In addition to including the support portions 92, the cone members 40 also include spherical portions 98 that are slidably engaged with the spherical member 46 of the wobble plate assembly 26 with annular seals 100 of the spherical member providing a slidably sealed relationship Also, annular seals 101 slidably seal between the grooves 56 of the spherical member 46 and the inner extremity 60 of the wobble plate 58.

As best illustrated in FIGS. 1 and 8, the vane 45 is located between the combustion chambers 68 and exhaust chambers 70 and extends through the slot 66 of the vane seal 64 previously mentioned in connection with FIGS. 4, 9 and 10. The wobble plate 58 has a radially extending round bore 102 and also includes radially extending openings 104 through which the vane 45 extends. The vane seal 64 includes a bifurcated dowel 106 having generally semicircular seal portions 108 that slidably contact opposite sides of the vane 45 as illustrated in FIG. 10. During the rolling of the wobble plate over the cone portions during the wobbling motion, the seal dowel 106 rotates within the bore 102 to accommodate for the angular change with respect to the vane 45 and the openings 104 accommodate for this angular change. Furthermore, on opposite sides of the vane seal 64, the wobble plate has milled slots 110 that receive closure plates 112 that block adjacent ends of a lubrication passage of an oil lubrication system that is hereinafter described.

With reference to FIG. 2, the wobble engine 20 includes an oil lubrication and cooling system 114 having an oil inlet 116 for supplying oil to the housing and also including housing passages 118, 120, 122, 124, 126, 128 and 130 for supplying the oil to the wobble plate assembly 26. More specifically, the oil inlet 116 feeds the passage 118 of the annular housing member 28 which in turn feeds the passage 120 in the adjacent end plate 88 for flow to the chamber-like passage 122 of the adjacent cone member 40. The support portion 92 of the cone member 40 has a plurality of angular passages 124 (only one shown) spaced circumferentially about the central axis A for flow to an annular passage 126 around the shaft 24 for flow at its interface passage 128 with the support portion 92 to the generally annular passage 130 around the shaft adjacent the wobble plate assembly 26 where it is secured by the adjacent lock nut 48. A helical groove 132 in the shaft moves the oil at the shaft-support portion interface passage 128 toward the wobble plate assembly so as to assist the annular seal 96 in sealing of the housing against oil flow outwardly. The oil lubrication and cooling system also includes distribution passages in the wobble plate assembly 26 for distributing the oil between the inner and outer extremities 60 and 62 of the wobble plate as is hereinafter more fully described. Furthermore, the oil distribution system includes return passages 134, 136, 138, 140, 142, 144 and 146 for returning the oil to an oil outlet 148 of the housing. More specifically, the oil is initially returned from the wobble plate assembly to a generally annular oil passage 134 around the adjacent lock nut 48 for flow through a return passage 136 at the interface of the shaft 24 and the support portion 92 of the associated cone member 40. An annular passage 138 in the cone member support portion 92 feeds a plurality of circumferentially spaced angular return passages 140 that provide oil flow to a chamber-like passage 142 of the adjacent cone member 40 for flow to a passage 144 in the adjacent end plate 88 to a return passage 146 in the annular housing member 28 and eventual flow to the oil outlet 148 for cooling and recycling. The shaft 24 adjacent the return passages has a second helical groove 150 that is of the opposite hand as the first helical groove 132 associated with the supply passages so as to move the oil away from the adjacent seal 96 toward the wobble plate assembly and thereby assist in the sealing operation by removing pressure from the seal.

With reference to FIG. 2, the spherical member 46 of the wobble plate assembly 26 includes circumferentially spaced supply passages 152 that extend from the housing supply passage 130 to the wobble plate 58 adjacent its inner extremity 60 which is hereinafter more fully described. Adjacent the wobble plate, an annular groove 154 (see also FIG. 11) that extends around the central axis A distributes the lubrication oil to the inner extremity 60 of the wobble plate 58. The spherical member 46 of the wobble plate also includes circumferentially spaced return passages 156 that extend from the inner extremity 60 of the wobble plate 58 to the housing return passage 134 adjacent the upper lock nut 48 shown in FIG. 2. These return passages 156 adjacent the wobble plate 58 have an annular groove 158 (see also FIG. 11) adjacent the wobble plate 58 so as to receive the oil from its inner extremity 60.

Figure 12:
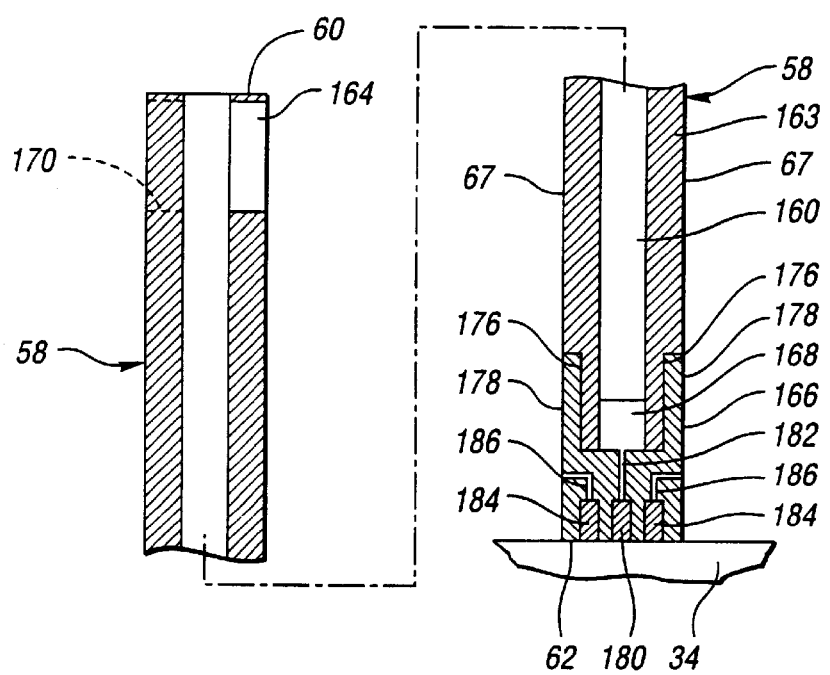
FIG. 12 is an enlarged sectional view through one side of the wobble plate generally as shown in FIGS. 2 and 3 but at an enlarged scale to further illustrate the construction of an outer annular central seal and a pair of outer annular side seals.

With combined reference to FIGS. 2 and 4, the wobble plate 58 includes first and second sets of radially extending distribution passages 160 and 162 extending between the inner and outer extremities 60 and 62 of the wobble plate. These first and second sets of distribution passages preferably are arranged in an alternating relationship circumferentially about the central axis A to provide uniformity in the cooling provided by the oil. The wobble plate 58 includes a central plate member 163 that defines the first and second sets of distribution passages 160 and 162. At the inner extremity 60 of the wobble plate 58, the central plate 163 defines a first set of passage openings 164 that supplies the oil to the first set of distribution passages 160 from the supply annular groove 154 of the spherical member 46 of the wobble plate assembly. The oil then flows from the supply openings 164 outwardly through the first set of distribution passages 160 in a radial direction from the central axis A to the outer extremity 62 of the wobble plate 58. At its outer extremity 62, the wobble plate includes an annular ring member 166 whose cross section as shown in FIG. 12 cooperates with the central plate member 163 to defme an annular outer distribution passage 168 that extends around the circumference of the wobble plate except at the vane seal 64 where the blockage plates 112 end the passage at each side of the vane seal as previously described in connection with FIGS. 9 and 10. The oil flowing outwardly from the first set of distribution passages 160 passes through the annular outer distribution passage 168 to the outer ends of the second set of distribution passages 162 for flow therethrough inwardly to the inner extremity 60 of the wobble plate. At its inner extremity 60 on the opposite side thereof from the supply openings 164, the central plate member 163 of the wobble plate 58 includes return openings 170 as shown in FIG. 2 for flow of the oil from the wobble plate to the return annular groove 158 in the spherical member 46 and thence for flow to the return passages 156 for further flow through the other return passages previously described to the oil outlet 148. The ring member 166 of the outer extremity 62 of the wobble plate 58 includes two generally semicircular portions 172 that are shown in FIG. 4 as having one junction adjacent the vane seal 64 and another junction 174 diametrically opposite the vane seal. The outer extremity 62 of the wobble plate 58 as shown in FIG. 12 has annular grooves 176 that receive annular projections 178 extending inwardly from the ring member 166. The ring member 166 and its portions 172 shown in FIG. 4 can be brazed to the outer extremity of the wobble plate 58 so as to be secured thereto in the construction shown.

As shown in FIG. 12, the outer extremity 62 of the wobble plate includes an outer annular central seal 180 that slidably seals with the spherically shaped outer annular portion 34 of the housing. Circumferentially spaced oil seal passages 182 of the ring member 166 of the outer extremity of the wobble plate extend from the annular outer distribution passage 168 to the central seal 180 to provide lubrication thereto during operation of the engine.

With continuing reference to FIG. 12, the outer extremity 62 of the wobble plate 58 also includes a pair of outer annular side seals 184 located on opposite sides of the outer annular central seal 180. Furthermore, the ring member 166 of the outer extremity 62 of wobble plate 58 has side seal passages 186 that extend from the outer annular cavity 44 (FIG. 2) of the housing to the side seals 184 shown in FIG. 12, such that pressure supplied to the side seals from the annular cavity provides sealing thereof with the spherically shaped outer portion 34 of the housing. It should be noted that the radially outwardly facing surfaces of the ring member 166, the central seal 180 and the side seals 184 are all machined with a convex spherical curvature about the central axis as well as axially along the central axis so as to effectively slidably seal with the spherically shaped interior of the outer annular portion 34 of the housing. The central seal 180 and the side seals 184 are received within annular grooves of the outer annular ring member 166 which also defines the oil passage 182 and the side seal passages 186 that are communicated with the seals.

Figure 5:
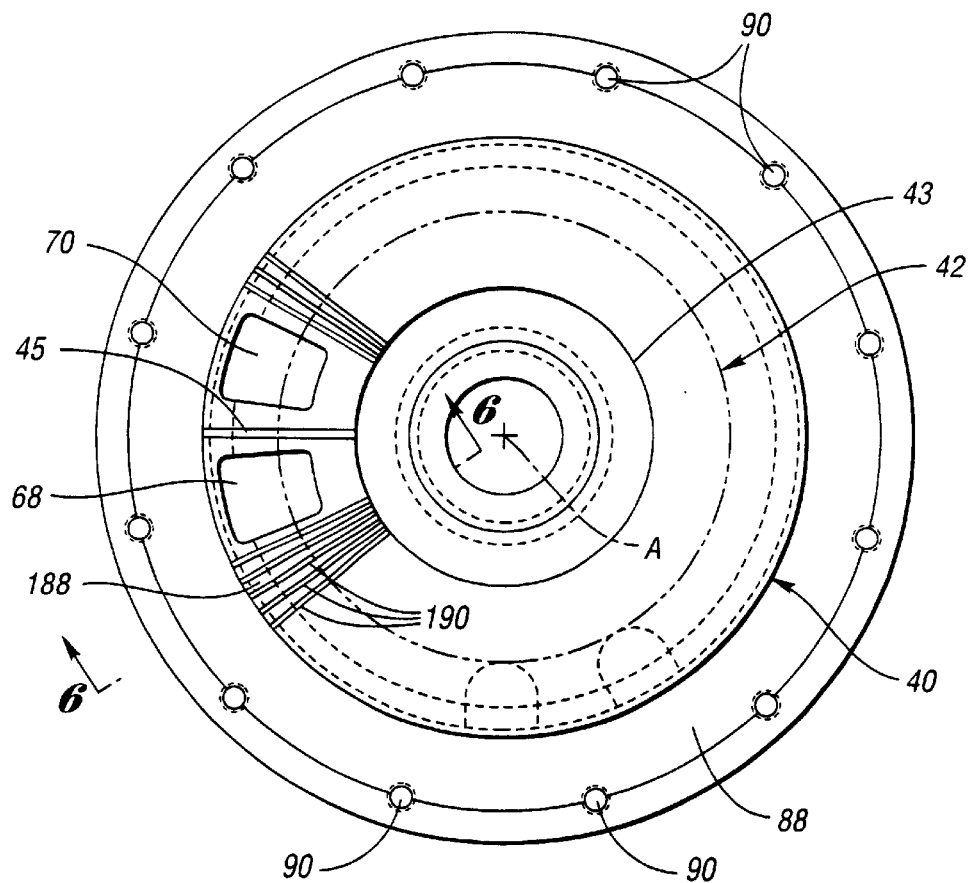
FIG. 5 is a view taken along the direction of line 5—5 in FIG. 2 to illustrate the construction of one of a pair of cone members of the engine.
Figure 6:
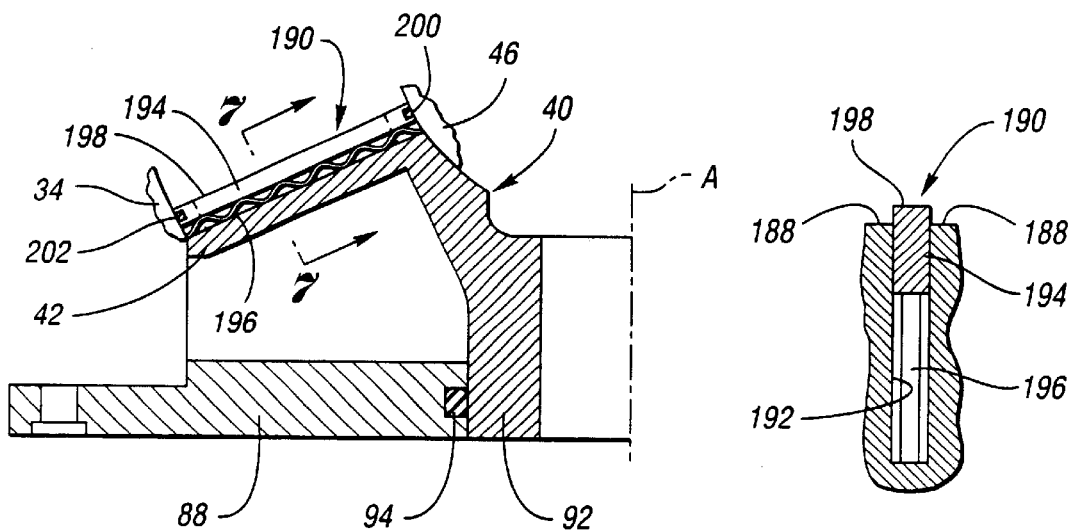
FIG. 6 is a sectional view taken along the direction of line 6—6 in FIG. 5 and illustrates the construction of plate seals of the cone member.
Figure 7:
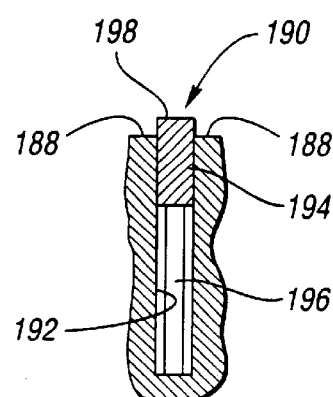
FIG. 7 is a sectional view taken along the direction of line 7—7 in FIG. 6 at an enlarged scale to further illustrate the construction of the plate seals.

With reference to FIGS. 5–7, each of the cone members 40 has a frustoconical surface 188 that defines its truncated cone portion 42 along which the wobble plate rolls as previously described. The frustoconical surface 188 of each cone member has plate seals 190 that extend radially and axially from the central axis A and that seal with the wobble plate 58 upon rolling thereof along the frustoconical surface. More specifically, the frustoconical surface 190 of each cone member 40 has seal grooves 192 as shown in FIG. 7 and each plate seal includes a seal member 194 that is received by the associated seal groove 192. Each plate seal 190 also includes a spring 196 that is received within the associated seal groove 192 to bias the seal member 94 outwardly from the groove against the wobble plate. The seal members 194 have outer extremities 198 that are resiliently positioned outwardly from the seal grooves 192 so as to resiliently engage and seal with the wobble plate upon the rolling thereof along the frustoconical surface 188 while becoming flush therewith once during each 360° cycle as the wobble plate rolls directly over the plate seal. Each seal member 194 as shown in FIG. 6 has an inner seal 200 that seals with the spherical member 46 of the wobble plate and also has an outer seal 202 that seals with the outer annular portion 34 of the housing.

Figure 13:
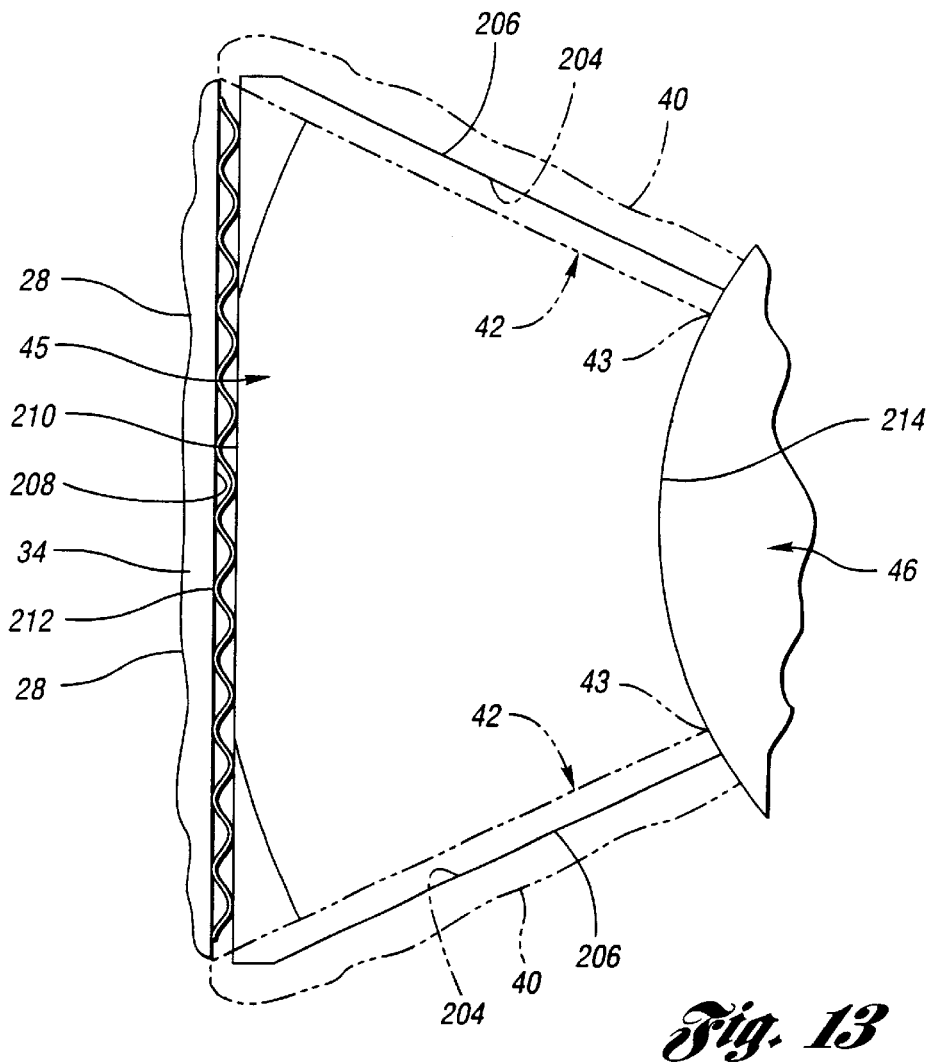
FIG. 13 is a somewhat schematic view taken generally as shown in FIGS. 2 and 3 to further illustrate the construction of a vane and a spring that biases the vane against the spherical member of the wobble plate assembly.

As illustrated best in FIG. 13, the pair of cone members 40 each have a vane groove 204 that receives the adjacent generally radially extending extremity 206 of the vane 45. Furthermore, the outer annular portion 34 of the annular housing member 28 has a vane groove 208 that receives the outer extremity 210 of the vane and also receives a spring 212 that biases the vane radially inwardly. The vane has a partial circular inner extremity 214 that slidably contacts the spherical member 46 of the wobble plate assembly and is biased thereagainst in a sealing relationship by the spring 212.

Figure 15:
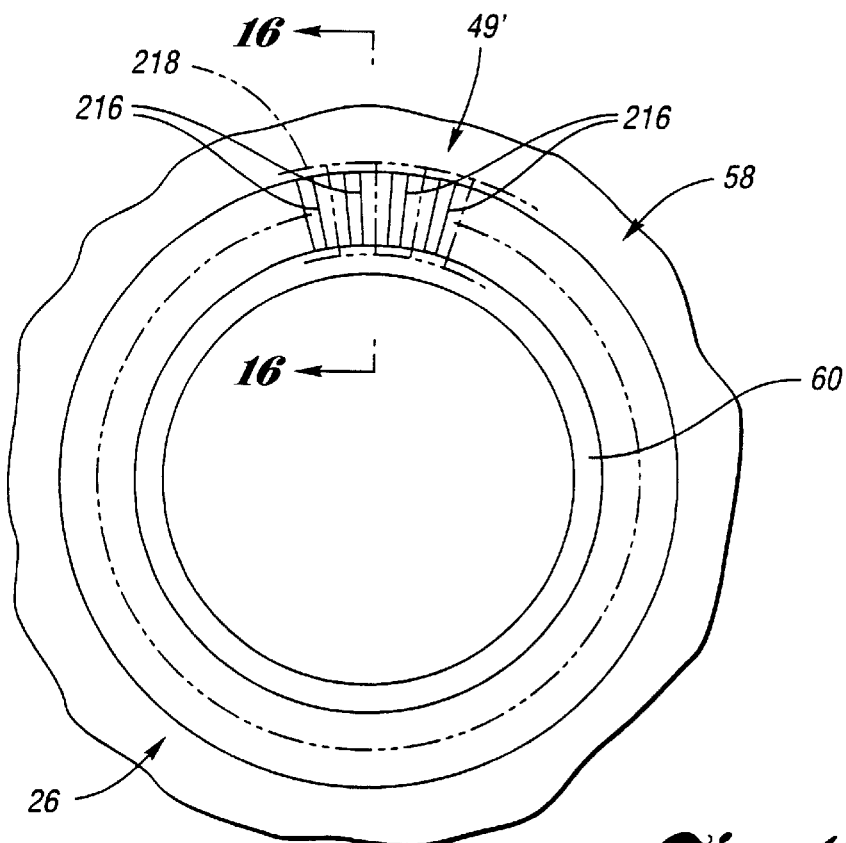
FIG. 15 is a partial axial view of the inner extremity of the wobble plate where another embodiment of the annular bearing is shown as an antifriction thrust bearing.
Figure 16:
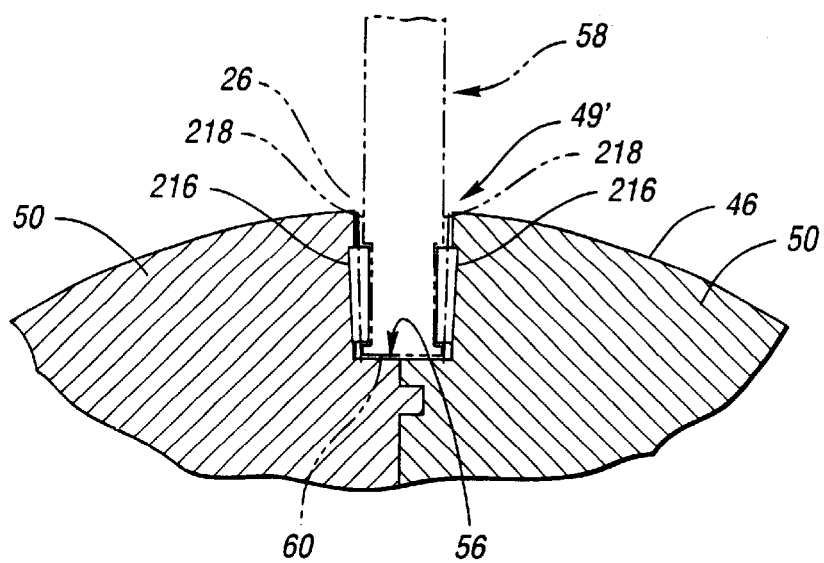
FIG. 16 is a sectional view taken along the direction of line 16—16 in FIG. 15 to further illustrate the construction of the antifriction thrust bearing.

With reference to FIGS. 15 and 16, another embodiment of the wobble plate assembly 26 has the same construction as the previously described embodiment except that its annular bearing 49' is an antifriction thrust bearing including roller elements 216 located within the annular groove 56 of the spherical member 50 on each side of the inner extremity 60 of the wobble plate. The roller elements 216 are separated by phantom line indicated cages 218 and most preferably have slightly tapered shapes that roll against complimentary tapered races on the inner extremity 60 of the wobble plate and on the sides of its groove 56.

Figure 18:
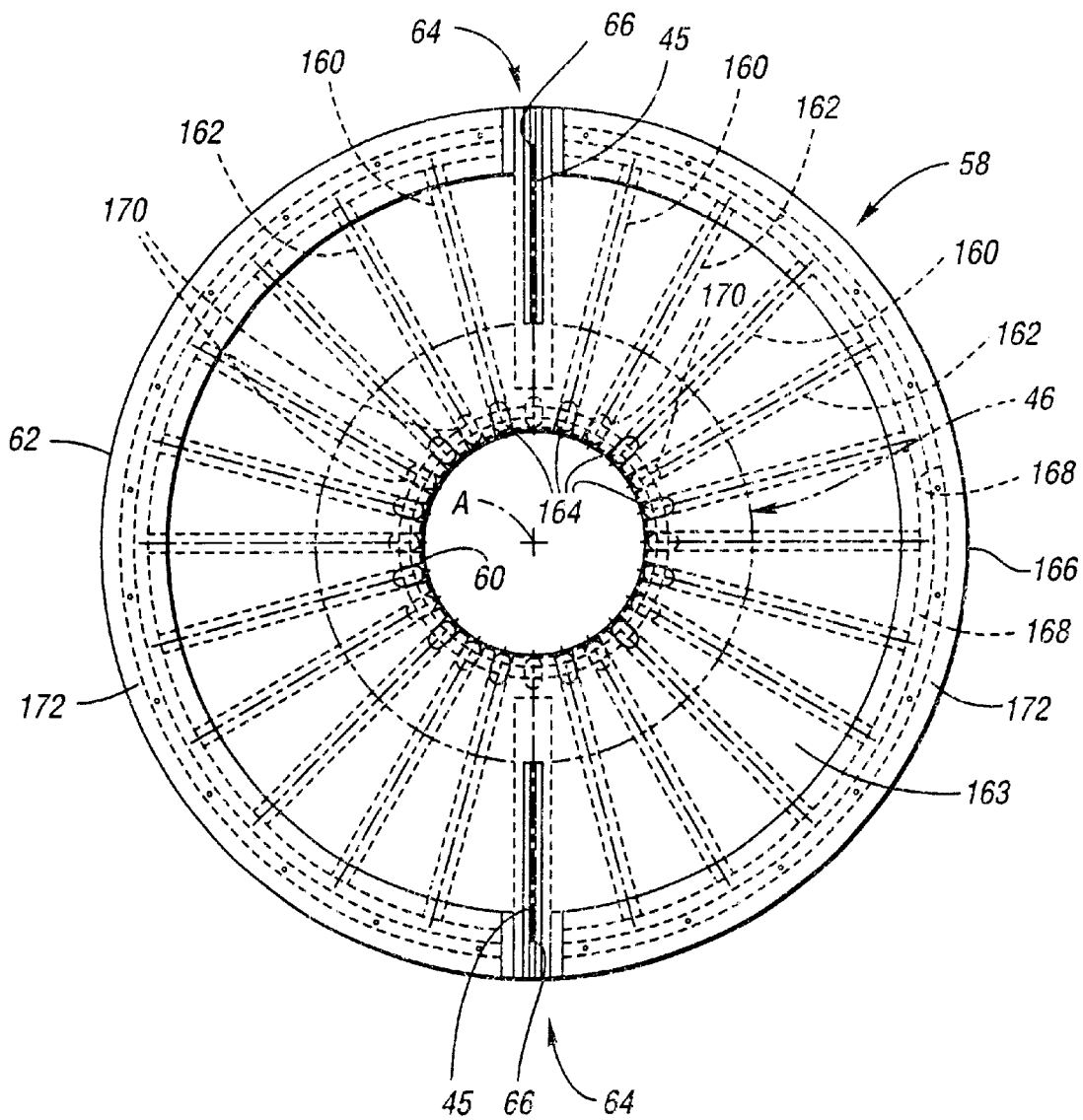
FIG. 18 is a view similar to FIG. 4 of another embodiment which includes a pair of vanes.

It should be appreciated that while te wobble engine has been disclosed a, an internal combustion engine, it also may have other uses such as a heat engine or a fluid power transfer device such as either a pump, compressor or motor, etc, Furthermore, while the wobble engine has been described specifically in connection with a single vane, tit is also possible to use two vanes and possible three or more, such as illustrated by the embodiment of FIG. 18 which includes a pair of vane 45 each of which has an associate seat 64 having a slot 66 through which te associated vane extends and of the contraction previously describe in connection with FIGS. 1, 4, 8 and 9. Also, when utilized as an engine or motor, axial force applied to the wobble plate 58 is converted to rotary motion of the shaft by the manner in which the inner extremity 60 of wobble plate is rotatably supported by the annular bearing 49, 49' When utilized a pump or compressor, rotary power from the shaft 24 is converted to axial motion of the wobble plate 58 by the manner in which the inner extremity 60 of the wobble plate is rotatably supported by the annular hearing 49, 49'.

Figure 17:
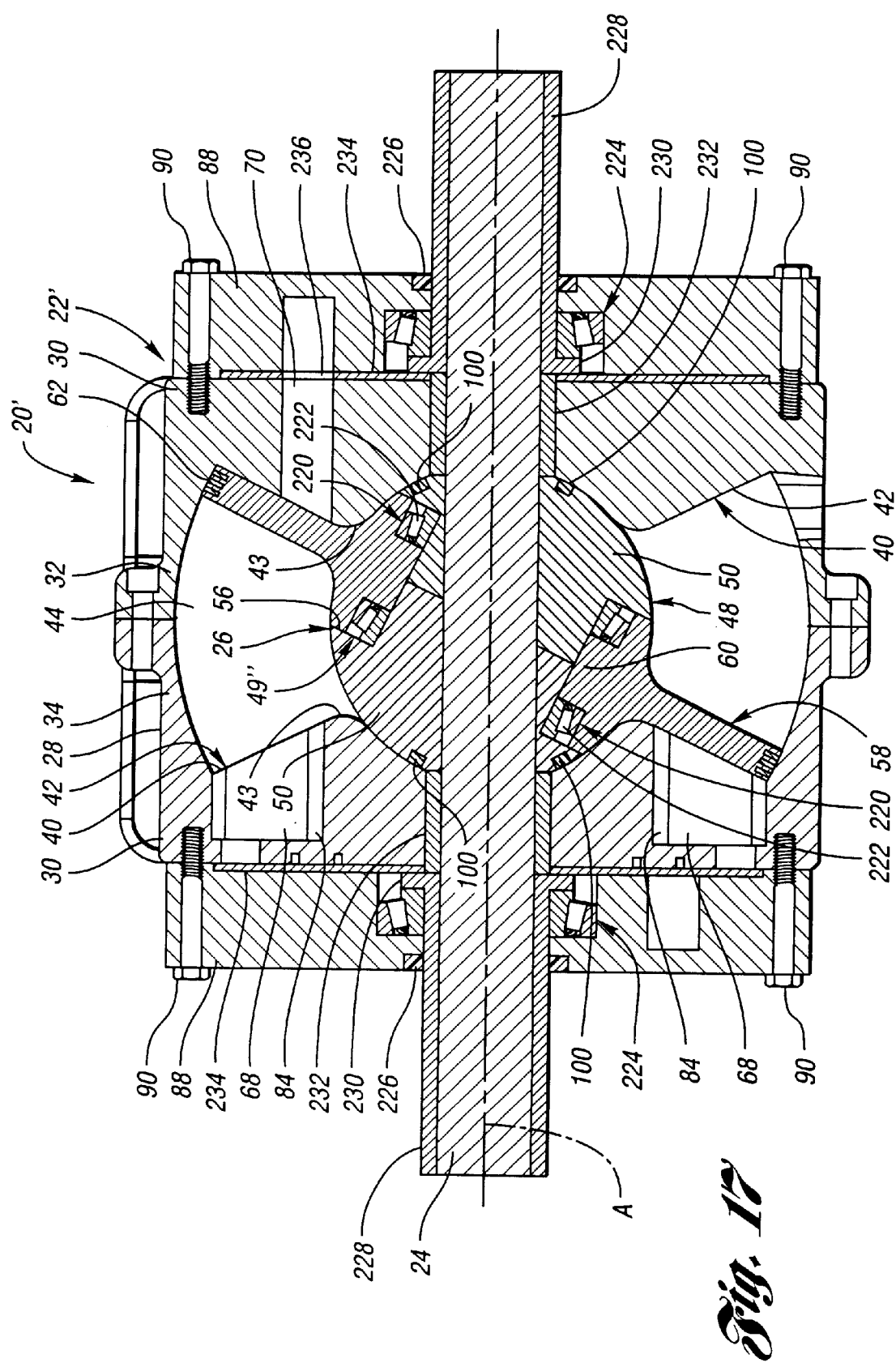
FIG. 17 is a sectional view through another embodiment of the wobble engine.

With reference to FIG. 17, another embodiment of the wobble engine 20' has a construction that in many aspects is similar to the construction of the embodiment previously described except as will be noted such that like components thereof bear like reference numerals and much of the prior description is applicable and will thus not be repeated.

In the embodiment of the wobble engine 20', the annular bearing 49" includes at least one antifriction roller bearing 220 that rotatably supports the inner extremity 60 of the wobble plate 58 on the spherical member 48. Actually there are a pair of the antifriction roller bearings 220 and each has roller elements 222 that rotate about associated axes extending transverse to the wobble plate 58, i.e., transverse to the plane of the wobble plate along the interface between the engaged hemispheres 50 of the spherical member 48.

With continuing reference to FIG. 17, the wobble engine 20' also includes a pair of antifriction roller bearings 224 that rotatably support the shaft 24 on the housing 22' for rotation about the central axis A. Furthermore, the wobble engine 20' includes a pair of annular seals 226 that rotatively seal between the shaft 24 and the housing 22' outward from the pair of antifriction roller bearings 224. The outer periphery 60 of the wobble plate 58 includes seals as previously described in connection with FIG. 12 and the spherical member 48 has the seals 100 with the spherical portions of the cone members 40 as also previously described.

The antifriction roller bearings 220 and 224, the wobble plate outer periphery seals, the spherical member seals 100, and the annular seals 226 are made of high temperature type materials that are capable of functioning in high temperature environments and preferably have high temperature coatings of a suitable type so that their high temperature operation can take place without the necessity for an oil lubrication and coolant system of the type previously described. In this connection, it should be noted that the antifriction roller bearings 220 and 224 may be of the sealed type so that they may include a certain amount of internal lubricant that facilitates their operation.

The shaft 24 of the wobble engine 20' illustrated in FIG. 7 includes an outer sleeve 228 that is splined to the shaft and has annular flanges 230 for axially positioning the inner races of the antifriction roller bearings 224 with the housing end caps 88 axially positioning the outer races. The shaft sleeve 228 also includes inner portions 232 that extend inwardly from the annular sleeve flanges 230 and axially position the spherical member 48 of the wobble plate assembly 26 along the central axis A at the proper location to provide its wobbling motion with respect to the cone members 40.

The wobble engine 20' illustrated in FIG. 17 also is disclosed as including a pair of round disc valves 234 with inner extremities that are respectively splined to the inner portions 232 of the shaft sleeve 228 and with circumferentially spaced openings 236 that control the flow of fuel and exhaust gases with respect to the combustion chamber 68 and the exhaust chamber 70.

While the best modes for carrying out the invention have been disclosed in detail, it should also appreciate that those familiar with the art will recognize various alternative designs and embodiments for practicing the invention as defined by the following claims.

What is claimed is:

1. A wobble engine comprising:
   a housing including an outer annular portion having an interior with a spherical shape that is symmetrically truncated on opposite sides of a great circle thereof, the housing also including a pair of cone portions that converge toward each other along a central rotational axis and that have truncated inner extremities, the spherically shaped outer annular portion cooperating with the truncated cone portions to define an annular cavity, and a vane that extends parallel to the central axis across the annular cavity;
   a shaft that extends along and is rotatable about the central axis; and
   a wobble plate assembly located within the housing for wobbling motion and including a spherical member rotatively fixed to the shaft, the spherical member having an annular bearing that extends obliquely with respect to the central axis, the wobble plate assembly also including a wobble plate of a generally annular shape having an inner extremity that is rotatably supported by the annular bearing of the spherical member and having an outer extremity that is slidably engaged with the spherical shape of the outer annular portion of the housing, the wobble plate having a slot that extends radially with respect to the spherical member and that receives the vane of the housing in a slidable relationship therewith, and the wobble plate having oppositely facing surfaces that respectively roll along the pair of truncated cone portions of the housing at diametrically opposite sides of the spherical member.

2. The wobble engine as in claim 1 wherein the housing includes a pair of combustion chamber spaced from each other along the central axis on one circumference side: of the vane an the housing also including a pair of exhaust chambers spaced from each other along the central axis on e opposite circumferential side of the vane as the pair of combustion chambers.

3. The wobble engine as in claim 2 wherein each of the pair of combustion chambers includes an associated fuel injector for injecting fuel thereinto for combustion.

4. The wobble engine as in claim 3 wherein each of the pair of combustion chambers includes a glow plug for igniting the fuel for combustion.

5. The wobble engine as in claim 2 wherein each of the pair of combustion chambers includes an associate fuel injector for receiving ammonia and nitrous oxide for injection thereinto, and each of the pair of combustion chambers include a glow plug for igniting the ammonia nitrous oxide for combustion.

6. The wobble engine as in claim 2 wherein each of the combustion chambers has a refractory liner.

7. Tho wobble engine as in claim 6 wherein the refractory liner of each combustion is made from a material selected from the group consisting of silicon carbide, a refractory oxide and a mixture of refractory oxides.

8. The wobble engine as in claim 2 wherein each of the part of combustion chambers includes an associated fuel injector for injecting fuel thereinto for combustion, each of the pair of combustion chambers including a glow plug for igniting the fuel for combustion, and each combustion chamber having a refractory liner.

9. The wobble engine as in claim 2 wherein each of te pair of combustion chamber includes an associated fuel injector for injecting ammonia and nitrous oxide thereinto for combustion, each of the pair of combustion chambers including a glow plug for igniting the ammonia and nitrous oxide for combustion, and each combustion chamber having a refractory liner.

10. The wobble engine as in claim 1 wherein the wobble plate includes a vane seal that define the slot thereof for slidably sealing with the vane.

11. The wobble engine as in claim in 10 wherein he wobble plate has a radially extending round bore and radially extending openings though which the vane extends, and the vast seal being a bifurcated dowel having seal portion that slidably contact opposite sides of the vane.

12. The wobble engine as in claim 1 further including an oil lubrication and cooling system for passing oil into the housing, through the wobble plate assembly, and back out of the housing.

13. The wobble engine as in claim 12 wherein the oil lubrication and cooling system includes an oil inlet to the housing, supply passages in the housing from the inlet to the wobble plate assembly, distribution passages in the wobble plate assembly for distributing the oil to the inner and outer extremities of the wobble plate, return passages in the housing from the wobble plate assembly, and an oil outlet to which the return passages return the oil from the wobble plate assembly for flow out of the housing for cooling and recycling.

14. The wobble engine as in claim 13 wherein the wobble plate includes a first set of radially extending distribution passages that are spaced circumferentially from each other and have inner and outer ends with the inner ends being fed oil from the supply passages adjacent the inner extremity of the wobble plate, an annular outer distribution passage that receives oil from the outer ends of the first set of radially extending distribution passages, and a second set of radially extending distribution passages that are spaced circumferentially from each other and have inner and outer ends with the outer ends receiving oil from the annular outer distribution passage and with the inner ends feeding the oil to the return passages for flow from the housing through the oil outlet.

15. The wobble engine as in claim 14 wherein the first and second sets of radially extending distribution passages of the wobble plate are circumferentially spaced in an alternate relationship with respect to each other for uniform cooling.

16. The wobble engine as in claim 14 wherein the outer extremity of the wobble plate includes an outer annular central seal that slidably seals with the spherically shaped outer annular portion of the housing, the outer extremity of the wobble plate having oil seal passages that extend from the annular outer distribution passage to the outer annular central seal to provide lubrication.

17. The wobble engine as in claim 16 wherein the wobble plate includes a pair of outer annular side seals located on opposite sides of the outer annular central seal, and the outer extremity of the wobble plate having side seal passages that extend from the annular cavity to the outer annular side seals such that pressure supplied thereto from the annular cavity provides sealing thereof with the spherically shaped outer annular portion of the housing.

18. The wobble engine as in claim 17 wherein the wobble plate includes a central plate and an outer annular ring that cooperates with the central plate to define the annular outer distribution passage the outer annular ring having an annular central groove that receives the outer annular central seal and having a pair of annular side grooves that respectively receive the pair of outer annular side seals, and the outer annular ring defining the oil seal passages a and the side seal passages.

19. The wobble engine as in claim 13 wherein threw shaft includes a first helical groove for preventing the oil from exiting the supply passages adjacent the shaft, and the shaft including a second helical groove for preventing the oil from exiting the return passages adjacent the shaft.

20. The wobble engine as in claim 1 wherein the annular bearing is a journal bearing including an annular groove in the spherical member that receives and rotatably supports the inner extremity of the wobble plate.

21. The wobble engine as in claim 1 wherein the annular bearing is an antifriction thrust bearing including, roller elements.

22. The wobble engine as in claim 1 wherein the housing includes a generally annular housing member having opposite axial ends and an intermediate portion that extends between its ends and defines the spherically shaped outer annular portion of the housing, and the housing including a pair of cone members that are respectively secured to the opposite axial ends of the annular housing member and have frustoconical surfaces chat define the truncated cone portions of the housings.

23. The wobble engine as in claim 22 wherein the frustoconical surfaces of the cone members have plate seals that extend radially and axially from the central axis and that seal with the wobble plate upon rolling thereof along the frustoconical surfaces.

24. The wobble engine as in claim 22 wherein the frustoconical surfaces of the cone members have seal grooves, the plate seals including seal members that are respectively received by the seal grooves and also including springs that resiliently bias the seal members, and the seal members having outer extremities Out are resiliently positioned outwardly from the seal grooves so as to resiliently engage and seal with the wobble plate upon the rolling thereof along the frustoconical surfaces.

25. The wobble engine as in claim 22 wherein the annular housing member and the pair of cone members have vane grooves that receive the vane that extends across the annular cavity of the housing; the vane having a partially circular inner extremity that slidably contacts the spherical member of the wobble plate assembly, and the vane groove of the annular housing member including a spring that resiliently biases the vane against the spherical member of the wobble plate assembly to accommodate for thermal expansion and contraction.

26. The wobble engine as in claim 22 wherein the housing includes a pair of annular end plates secured to the annular housing member, the pair of cone members having support portions that are respectively supported by the pair of annular end plates, and the support portions of the cone members having the shaft extending therethrough and including seals that rotatably seal with the shaft and with the spherical member of the wobble plate.

27. The wobble engine as in claim 22 wherein the annular housing member includes half sections that have semicircular shapes that are secured to each other.

28. The wobble engine as in claim 1 wherein the spherical member of the wobble plate assembly includes a pair of hemispheres having engaged faces that each include an annular groove portion for cooperating with the other annular groove portion to define an annular groove of the annular bearing.

29. The wobble engine as in claim 1 wherein the annular bearing includes at least one antifriction roller bearing that rotatably supports the inner extremity of the wobble plate on the spherical member and has roller elements that rotate about associated axes extending transverse to the wobble plate.

30. The wobble engine as in claim 1 further including a pair of antifriction roller bearings that rotatable support the shaft on the housing.

31. The wobble engine as in claim 30 further including a pair of seals that rotatively seal between the shaft and the housing outward from the pair of antifriction roller bearings that rotatably support the shaft on the housing.

32. The wobble engine as in claim 1 wherein the annular bearing includes a pair of antifriction roller bearings that rotatably support the inner extremity of the wobble plate on the spherical member and have roller elements that rotate about associated axes extending transverse to the wobble plate, a pair of antifriction roller bearings that rotatably support the shaft on the housing, and a pair of seals that rotatively seal between the shaft and the housing outward from the pair of antifriction roller bearings that rotatably support the shaft on the housing.

33. The wobble engine as in claim 1 wherein the housing includes a second vane that extends parallel to the central axis across the annular cavity, and the wobble plate having a second slot that extends radially with respect to the spherical member and that receives the second vane of the housing in a slidable relationship therewith.

34. The wobble engine as in claim 33 wherein the wobble plate includes a pair of vane seals that define the slot thereof for slidably sealing with the vanes.

35. The wobble engine as in claim 34 wherein the wobble plate has a pair of radially extending round bores and radially extending openings through which the vane extend, and each vane seal being a bifurcated dowel having seal portions that slidably contact opposite sides of the vane.

36. A wobble engine comprising:

a housing including an outer annular portion having a spherical shape that is symmetrically truncated on opposite sides of a great circle thereof, the housing also including a pair of cone portions that converge toward each other along a central rotational axis and that have truncated inner extremities, the spherically shaped outer annular portion cooperating with the truncated cone portions to define an annular cavity, and a vane that extends parallel to the central axis across the annular cavity;

a shaft that extends along and is rotatable about the central axis;

a wobble plate assembly located within the housing for wobbling motion and including a spherical member rotatively fixed to the shaft, the spherical member having an annular bearing that extends obliquely with respect to the central axis, the wobble plate assembly also including a wobble plate of a generally annular shape having an inner extremity that is rotatably supported by the annular bearing of the spherical member and having an outer extremity that is slidably engaged with the spherical shape of the outer annular portion of the housing, the wobble plate having a slot that extends radially with respect to the spherical member and that receives the vane of the housing in a slidable relationship therewith, and the wobble plate having oppositely facing surfaces that respectively roll along the pair of truncated cone portions of the housing at diametrically opposite sides of the spherical member; and an oil lubrication and cooling system for passing lubrication oil into the housing, through the wobble plate assembly, and back out of the housing, the oil lubrication and cooling system including an oil inlet to the housing, supply passages in the housing from the inlet to the wobble plate assembly, distribution passages in the wobble plate assembly for distributing the oil to the inner and outer extremities of the wobble plate, return passages in the housing from the wobble plate assembly, and an oil outlet to which the return passages return the oil from the wobble plate assembly for flow out of the housing for cooling and recycling.

37. A wobble engine comprising:

a housing including an outer annular portion having a spherical shape that is symmetrically truncated on opposite sides of a great circle thereof, the housing also including a pair of cone portions that converge toward each other along a central rotational axis and that have truncated inner extremities, the spherically shaped outer annular portion cooperating with the truncated cone portions to define an annular cavity, a vane that extends parallel to the central axis across the annular cavity, a pair of combustion chambers spaced from each other along the central axis on one circumferential side of the vane, and a pair of exhaust chambers spaced from each other along the central axis on the opposite circumferential side of the vane as the pair of combustion chambers;

a shaft that extends along and is rotatable about the central axis;

a wobble plate assembly located within the housing for wobbling motion and including a spherical member rotatively fixed to the shaft, the spherical member having an annular bearing that extends obliquely with respect to the central axis, the wobble plate assembly also including a wobble plate of a generally annular shape having an inner extremity that is rotatably supported by the annular bearing of the spherical member and having an outer extremity that is slidably engaged with the spherical shape of the outer annular portion of the housing, the wobble plate having a slot that extends radially with respect to the spherical member and that receives the vane of the housing in a slidable relationship therewith, and the wobble plate having oppositely facing surfaces that respectively roll along the pair of truncated cone portions of the housing at diametrically opposite sides of the spherical member under the impetus of combustion in the combustion chambers; and an oil lubrication and cooling system for passing lubrication oil into the housing, through the wobble plate assembly, and back out of the housing, the oil lubrication and cooling system including an oil inlet to the housing, supply passages in the housing from the inlet to the wobble plate assembly, radially extending distribution passages in the wobble plate assembly for distributing the oil to the inner and outer extremities of the wobble plate, return passages in the housing from the wobble plate assembly, and an oil outlet to which the return passages return the oil from the wobble plate assembly for flow out of the housing for cooling and recycling.

38. A wobble engine comprising:

a housing including an outer annular portion having a spherical shape that is symmetrically truncated on opposite sides of a great circle thereof, the housing also including a pair of cone portions that converge toward each other along a central rotational axis and that have truncated inner extremities, the spherically shaped outer annular portion cooperating with the truncated cone portions to define an annular cavity, a vane that extends parallel to the central axis across the annular cavity, a pair of combustion chambers spaced from each other along the central axis on one circumferential side of the vane, and a pair of exhaust chambers spaced from each other along the central axis on the opposite circumferential side of the vane as the pair of combustion chambers;

a shaft that extends along and is rotatable about the central axis;

a pair of antifriction roller bearings that rotatively support the shaft on the housing for rotation about the central axis;

a pair of annular seals that rotatably seal between the shaft and the housing outward from the antifriction roller bearings that rotatably support the shaft on the housing; and a wobble plate assembly located within the housing for wobbling motion and including a spherical member rotatively fixed to the shaft, the spherical member having an annular bearing that extends obliquely with respect to the central axis and includes a pair of antifriction roller bearings having roller elements, the wobble plate assembly also including a wobble plate of a generally annular shape having an inner extremity that is rotatably supported by the antifriction roller bearings of the annular bearing of the spherical member with the roller elements thereof rotating about associated axes that extend transversely to the wobble plate, the wobble plate having an outer extremity that is slidably engaged with the spherical shape of the outer annular portion of the housing, the wobble plate having a slot that extends radially with respect to the spherical member and that receives the vane of the housing in a slidable relationship therewith, and the wobble plate having oppositely facing surfaces that respectively roll along the pair of truncated cone portions of the housing at diametrically opposite sides of the spherical member under the impetus of combustion in the combustion chambers.

* * * * *

UNITED STATES PATENT AND TRADEMARK OFFICE
CERTIFICATE OF CORRECTION

PATENT NO.    : 6,390,052 B1
DATED         : May 21, 2002
INVENTOR(S)   : Harold A. McMaster and Robert G. McMaster It is certified that error appears in the above-identified patent and that said Letters Patent is hereby corrected as shown below:

Column 12,
Line 4, replace "chamber" with -- chambers --.
Line 5, replace "circumference" with -- circumferential --.
Line 5, after "side" delete ":".
Line 6, after "vane" insert -- , --.
Line 6, replace "an" with -- and --.
Line 7, replace "e" with -- the --.
Line 20, replace "include" with -- including --.
Line 29, replace "part" with -- pair --.
Line 34, replace "te" with -- the --.
Line 35, replace "chamber" with -- chambers --.
Line 42, replace "define" with -- defines --.
Line 44, after "claim" delete -- in --.
Line 44, replace "he" with -- the --.
Line 47, replace "vast" with -- vane --.
Line 48, replace "portion" with -- portions --.

Column 13,
Line 36, after "passages" delete "a".
Line 38, replace "threw" with -- the --.
Line 57, replace "chat" with -- that --..
Line 58, replace "housings" with -- housing --.

Column 14,
Line 2, replace "Out" with -- that --.
Line 40, replace "rotatable" with -- rotatably --.
Line 67, replace "vane" with -- vanes --.

Signed and Sealed this

Nineteenth Day of November, 2002

JAMES E. ROGAN
Director of the United States Patent and Trademark Office

*Attest:*

*Attesting Officer*